Patented May 1, 1951

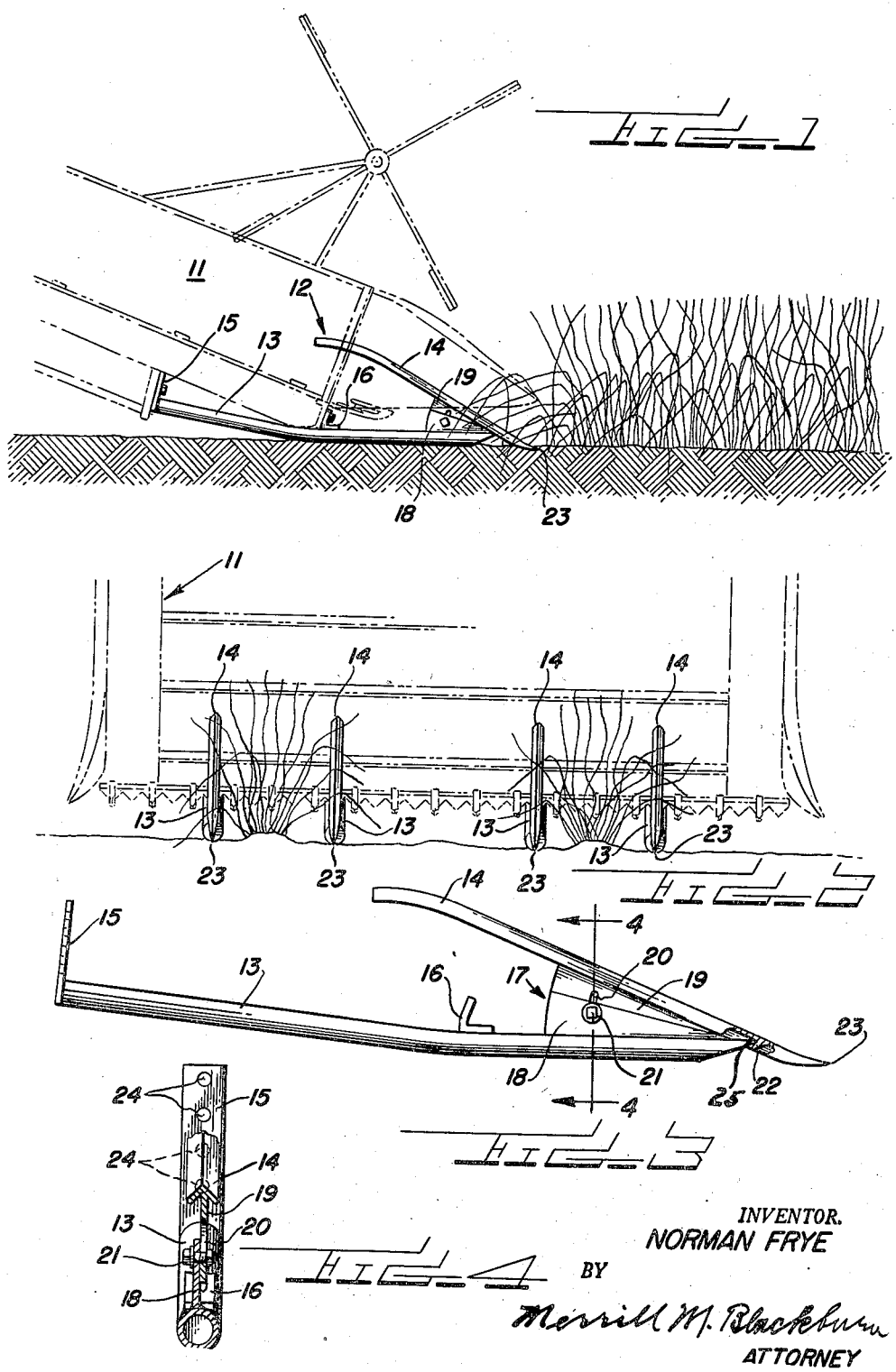

2,551,258

UNITED STATES PATENT OFFICE 2,551,258

SUPPLEMENTAL LIFTING FINGERS FOR COMBINES

Norman Frye, near Davenport, Iowa

Application July 12, 1948, Serial No. 38,229

4 Claims. (Cl. 56—312)

The present invention relates to means for attachment to a combine for the purpose of lifting grain stalks into a position to be cut by the sickle of a combine, when the crop is of such a nature that many stalks are not standing up in a position to be caught and cut by the sickle of the machine. In this application, I shall use the word "grain" in a broad sense to indicate vegetation bearing seeds which are to be removed from the stalks by threshing, and more particularly to such crops as are planted in rows, for example, beans. It is my intention to provide a structure which can be attached to the underside of a combine platform, which will raise the grain into a position such that the sickle of the combine will contact and cut the grain slightly above the ground, this structure being such that it will hold the combine platform in a position so that the sickle will always be above the surface of the ground and will never be fouled by running into the ground. The principal object of this invention is the provision of an attachment for the purpose indicated which will get down to the surface of the ground or dig slightly into it so that it will be certain to pick up substantially all stalks which are bent over, in order to insure that they will be reached by the sickle and be cut thereby. My invention further resides in the combination, construction, and arrangement of parts illustrated in the accompanying drawings and, while I have shown therein what is now regarded as the preferred embodiment of this invention, I desire the same to be understood as illustrative only and not to be interpreted in a limiting sense.

In the drawing annexed hereto and forming a part hereof,

Fig. 1 is a more or less diagrammatic side view of a combine with the structure of my invention attached thereto;

Fig. 2 is a similar front view showing four devices according to my invention attached to a two-row combine, one of these devices being arranged on each side of each row to insure that the stalks spreading out sidewise of the rows will be raised up higher than the sickle by the time the sickle reaches them;

Fig. 3 shows a side elevation of the structure constituting the subject-matter of this invention, detached from the combine; and Fig. 4 represents a transverse section taken substantially along the plane indicated by the line 4—4, Fig. 3, a part of the structure being broken away to show the holes in the rear bracket for adjusting the device, vertically, relatively to the combine.

Reference will now be made in greater detail to the annexed drawings for a more complete description of this invention. The combine is shown by broken lines and is indicated by the reference numeral 11. The device of this invention is shown in Fig. 3 and is indicated generically in Fig. 1 by the numeral 12. It comprises a runner 13, a separator 14, a rear attaching bracket 15, a front attaching bracket 16, and adjusting means 17 which may be used in regulating the height of the separator relatively to the runner. By virtue of the front and rear attaching brackets, 16 and 15, respectively, the runner is fixedly secured to the platform of the combine so as to support the platform just above the surface of the ground, as best shown in Fig. 1, there being sufficient leeway at the front bracket 16 to make possible the easy securing of the rear bracket 15 to the combine in different positions, as described below. The forward end of the runner 13 is cut on a diagonal and filled to prevent dirt from getting in when running on the ground. The web 18 may be a single web or more than one but I prefer to use a single web 19 which will fit fairly closely between two webs 18. The web 19 has a slot 20 formed therein and a bolt 21 passes through a bolt hole in the web or webs 18 and the slot 20. A nut will be tightened up on the bolt 21 to hold the webs in adjusted position when the runner and separator have been adjusted to the desired relationship.

The separator 14 is made of angle iron, the forward end portion being pointed and partly filled with metal, as shown at 22, to form a socket for the reception of the pointed end 25 of the runner 13. The bolt 21 is not only to hold the parts in adjustment but also it keeps the point 25 in the socket in the underside of the separator. It is clear from Fig. 3 that the forward end of the separator is not only reduced to a point but it is bent up somewhat to keep it from digging into the ground and causing breakage to occur. It is clear from Fig. 4 that the rear bracket 15 has holes 24 formed therein which make possible the adjustment of the angular relationship of the runner 13 with reference to the platform of the combine. In Fig. 4, I have shown a single web 18 but it will be understood this may be replaced by a pair of webs, one on each side of the web 19. Then, when this attachment is to be used with a narrow combine for the threshing of a single row of vegetation, there will be but two of these devices provided, one on each side of the row.

It is desired to point out that this construction holds the platform a substantially fixed distance from the ground, once the platform has been lowered into a position such that the runners 13 rest on the ground and it is unnecessary to give further attention to adjusting the position of the platform.

It will of course be understood that the specific description of structure set forth herein may be departed from without departing from the spirit of this invention as disclosed in this specification and as defined by the appended claims.

Having now described my invention, I claim:

1. An attachment for a combine for picking up bean vines which are not standing up, comprising a runner, means for fixedly connecting said runer at spaced points to the underside of the combine platform, said runner projecting forwardly beyond the sickle-bar and being adapted to slide on the earth's surface and thus at least partially support the platform, a separator, pointed at its forward end, having a socket in its under side somewhat to the rear of its forward end, and connected to the runner to be vertically adjustable with relation thereto, the point of the runner pivotally fitting in the socket and allowing a certain freedom of vertical adjustment of the separator with relation to the runner, and securing means for holding the point of the runner in said socket and also holding the runner and separator in adjusted position.

2. A structure as defined by claim 1 in which said runner has at its forward portion a bracket for attachment to a forward portion of the combine platform and at its rear end a bracket for attachment to a combine platform rearwardly of said forward portion, said rear bracket having a plurality of holes therein whereby the angular relationship of the runner and the combine platform, in a vertical direction, may be adjusted, substantially above the forward bracket as a center.

3. In a structure for the purpose stated, a runner for attachment to the underside of a combine platform, brackets for fixedly connecting the runner to the platform in order to support the latter, the forward end portion of the runner being bent upwardly somewhat so that the forward end portion of the runner will be substantially parallel to the earth's surface in use and will slide thereon when supporting the platform, a pointed separator pivotally connected rearwardly of its forward end to the forward end of the runner and adjustable in a vertical plane to various angles with relation to the runner, said separator being shaped so that its forward end lies substantially directly ahead of the forward end of said runner.

4. In a structure for the purpose indicated, a runner, means for fixedly securing the runner for a vertically adjustable attachment to the underside of a combine platform with the approximately forward half of the runner sliding on the ground surface and supporting the platform, said runner having its forward end cut diagonally and closed to produce a runner effect thereat, a generally triangular web secured to the upperside of the runner and having a bolt passed therethrough, and a separator pivotally connected to the runner and having a web secured to its underside to cooperate with the web on the runner in holding the separator and runner in relatively adjusted position, said webs overlapping and said bolt passing through said webs to hold them relatively immovable.

NORMAN FRYE.

REFERENCES CITED

The following references are of record in the file of this patent:

UNITED STATES PATENTS

| Number | Name | Date |
|--------|------|------|
| 95,188 | Bonney, Jr. | Sept. 28, 1869 |
| 1,936,006 | Braden | Nov. 21, 1933 |
| 2,044,396 | Peran | June 16, 1936 |
| 2,290,404 | Cardinal | July 21, 1942 |